United States Patent

[11] 3,568,749

| [72] | Inventors | Hans Menell<br>Ahlem Hannover;<br>Friedrich Bartsch, Hannover-<br>Herrenhausen, Germany |
|---|---|---|
| [21] | Appl. No. | 741,714 |
| [22] | Filed | July 1, 1968 |
| [45] | Patented | Mar. 9, 1971 |
| [73] | Assignee | Continental Gummi-Werke<br>Aktiengesellschaft<br>Hannover, Germany |
| [32] | Priority | July 5, 1967 |
| [33] | | Germany |
| [31] | | P 16 05 634.1 |

[54] PNEUMATIC VEHICLE TIRE
1 Claim, 6 Drawing Figs.

[52] U.S. Cl............................................ 152/354,
152/361
[51] Int. Cl......................................... B60c 11/00
[50] Field of Search.......................................... 152/354,
355, 356, 357, 358, 359, 360, 361

[56] References Cited
UNITED STATES PATENTS

| 3,481,386 | 12/1969 | Menell et al................. | 152/354 |
| 2,493,614 | 1/1950 | Bourdon........................ | 152/361 |
| 3,052,275 | 9/1962 | Hylbert........................ | 152/354 |
| 3,275,056 | 9/1966 | Menell.......................... | 152/356 |
| 3,414,447 | 12/1968 | Travers......................... | 152/356 |

*Primary Examiner*—Drayton E. Hoffman
*Attorney*—Walter Becker

ABSTRACT: A pneumatic vehicle tire with a carcass reinforcement of substantially parallel strength members which pass in one piece from bead to bead while forming components of rubberized cord layer means and in the tire sidewalls extend at least approximately at right angles with regard to the circumferential direction of the tire whereas in the zenith portion of said tire said strength members pass across the width of the tread strip at an angle of from 5 to 30° with regard to the tire circumferential direction, those portions of said strength members which extend from bead to bead being looped around the beads and being extended back into the shoulder areas of the tire.

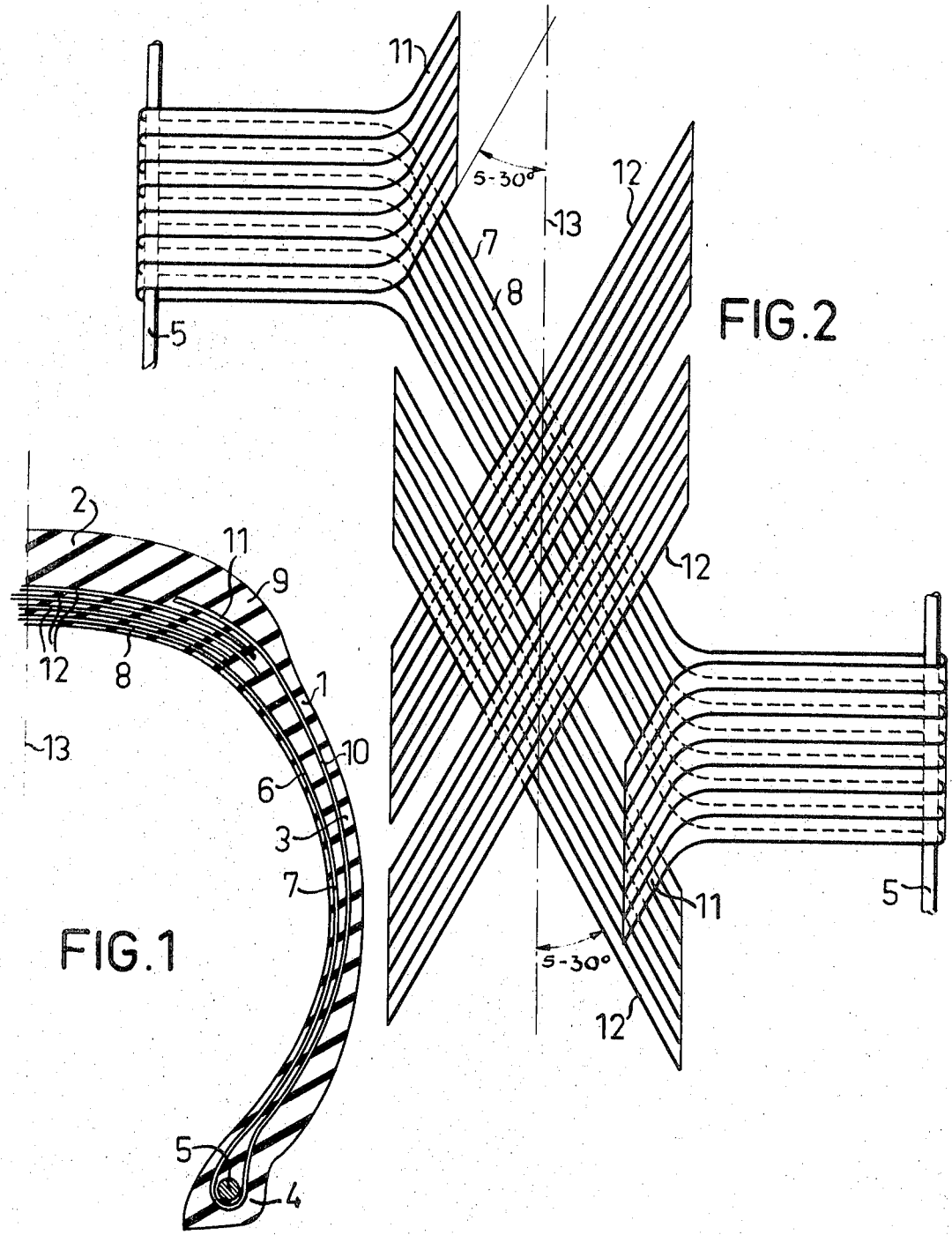

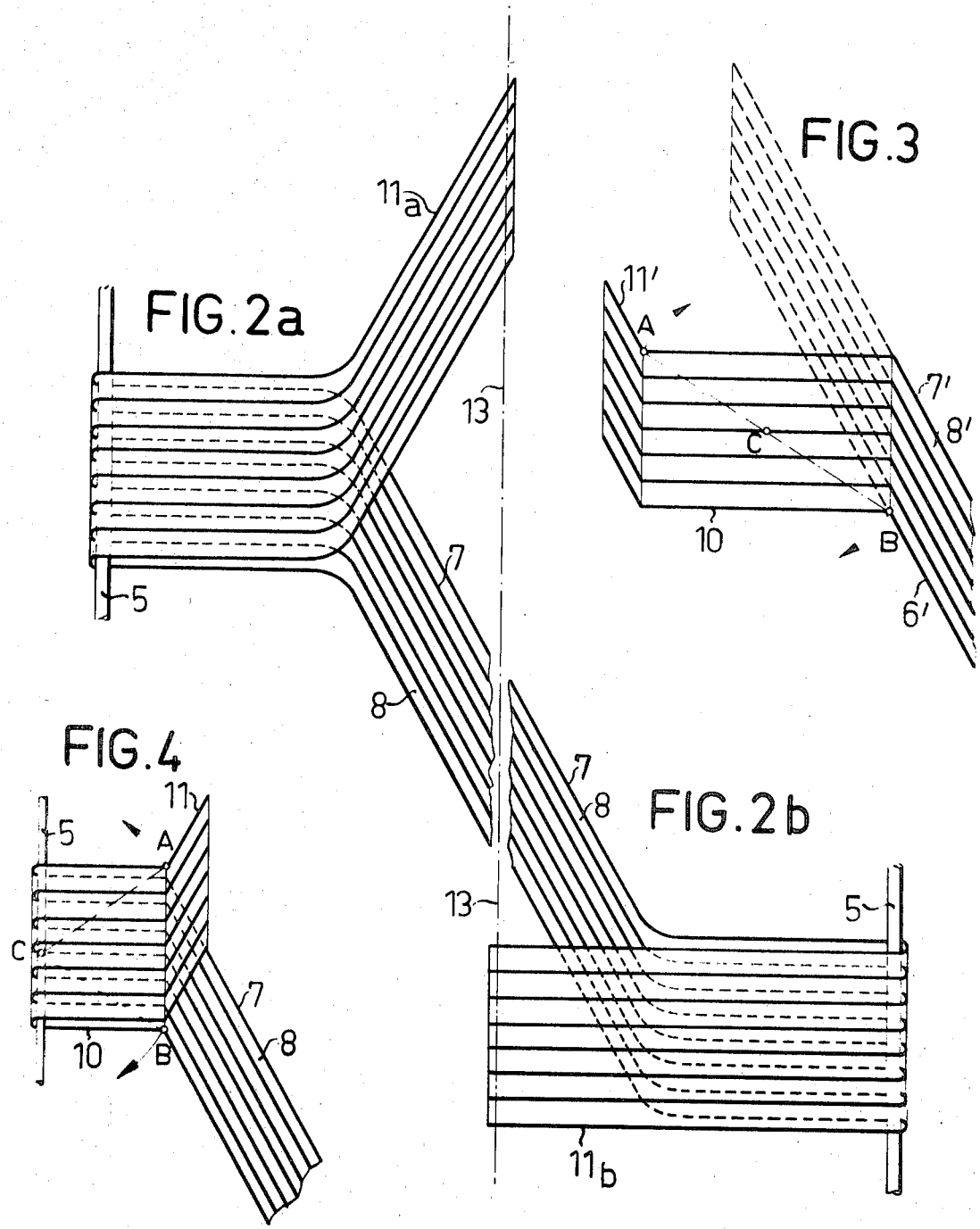

PNEUMATIC VEHICLE TIRE

The present invention relates to a pneumatic vehicle tire with a carcass reinforcement of parallel strength members such as threads, cords, or the like which extend from bead to bead and in the tire sidewalls extend at a right or practically right angle to the tire circumferential direction while said strength members in the tire zenith portion over approximately the width of the tread strip and below the same form an angle of from 5° to 30° with the tire circumferential direction. The thus placed strength members which extend from bead to bead form during the manufacture of the tire components of one or more rubberized cord fabric layers which at the start of the tire manufacture extend rectilinearly but in the course of the making of the tire obtain their final shape by bending or angling off.

Accordingly, the manufacture of the above-mentioned tires starts with rubberized cord fabric layers which in a manner known per se extend in straightened out condition. Only during the buildup of the tire on the tire-building drum are the cord threads deformed by angling off or bending, so that the cord threads are no longer stretched out rectilinearly but preferably follow a Z-shaped course. This manufacturing method which is advantageous nevertheless brings about that the rubberization of the cord fabric layers, which rubberization is still in a plastic elastic state during the buildup of the tire, undergoes a deformation in conformity with the deformation of the cord threads. This deformation of the rubberization generates restoring forces within the still unvulcanized cord fabric layers. These restoring forces which try to return the cord fabric layers or the cord threads embedded therein to their original shape bring about disadvantageous deformations of the unfinished tire. These deformations may lead to undue deformation of the unfinished tire in the tire vulcanizing mold, and to faulty vulcanization.

It is, therefore, an object of the present invention to provide a pneumatic vehicle tire which will overcome the above-mentioned drawbacks.

It is another object of this invention to provide a pneumatic tire in which the cord fabric layers are so placed and arranged that the above-mentioned restoring forces will cancel each other.

These and other objects and advantages of the invention will appear more clearly from the following specification in connection with the accompanying drawing, in which:

FIG. 1 represents a radial section through a portion of a pneumatic vehicle tire according to the invention;

FIG. 2 shows the cord threads of the tire according to FIG. 1 which extend in an uninterrupted manner from bead to bead. For the sake of a simplified illustration, the cord threads are shown as being located in the drawing plane;

FIGS. 2a and 2b show separately the location of cord threads in a manner similar to that of FIG. 2 in which cord threads are shown in superimposed relationship;

FIG. 3 is a top view of a portion of a cord fabric layer from which the cord threads are to be formed which lead from bead to bead; and FIG. 4 illustrates the cord fabric layer of FIG. 3 in conformity with the illustration of FIGS. 2 and 3, but differing from FIG. 3 in that the cord fabric layer is show looped around a bead core.

The objects outlined above have been realized, in conformity with the present invention, by so designing the tire that the tire sections which extend through the tire sidewalls at a right or practically right angle, with regard to the circumferential direction of the tire, are looped around the tire beads and extended so as to extend through the tire sidewalls into the area of the tire shoulders. In this connection, it is particularly expedient to extend the thread sections into the area of the tire zenith portion in which the threads which extend without interruption from bead to bead form an acute angle with the circumferential direction of the tire. In addition, additional thread sections in the area of the tire zenith portion may extend at an incline with regard to the tire circumferential direction while, however, this incline is in a direction opposite to the incline or acute angle formed by the other thread sections with the tire circumferential direction.

In view of the fact that the thread sections which extend to the tire sidewalls at a right angle or practically right angle with regard to the tire circumferential direction, extend into the area of the tire shoulders while being looped around the tire beads and extending through the tire sidewalls, reaction forces are likewise built up during the tire manufacture for these additional thread sections forming an extension of the thread portions extending from bead to bead. These last-mentioned reaction forces act in an opposite direction to those of the remaining thread sections which lead from the tire shoulder downwardly to the tire beads.

Referring more specifically to the drawing, the tire body 1 shown therein and made of rubber or rubberlike materials comprises a tread strip 2, sidewalls 3 and bead cores 5 embedded in the tire beads 4. The tire body 1 has a cord fabric layer 6 with parallel cord threads 7. Inwardly of the tread strip 2, the cord threads 7 extend at an angle of approximately 20° with regard to the tire circumferential direction. These oblique thread sections 8 extend from one tire shoulder 9 to the oppositely located tire shoulder 9 and in the area of said shoulders are bent off and then extend to the bead cores 5 over the shortest path. The cord threads 7 which pass through the tire sidewalls 3 extend at a right angle with regard to the tire circumferential direction. The cord threads 7 are then looped around the bead cores 5 and pass outwardly so as to form thread sections 10 which are extended up to the shoulder areas 9. The ends 11 of the last-mentioned thread sections 10 which as mentioned, extend to the shoulder areas 9, are likewise bent off. The ends 11 also form angles of approximately 20° with regard to the tire circumferential direction, but the incline of said ends 11 to the tire circumferential direction is opposite to the incline of the thread sections 8 with regard to the tire circumferential direction.

Between the ends 11 on one hand, and the thread sections 8 on the other hand, there are provided belt layers 12 which extend substantially over the width of the tread strip 2. The cord threads of one belt layer 12 extend in the direction of the thread sections 8, whereas the cord threads of the remaining portion of the belt layer 12 are parallel to the ends 11 and thus extend at an opposite incline to that of the thread sections 8. In this way, below the tread strip 2 there is formed a cross-connection composed of four layers, which is pull resistant in the circumferential direction of the tire and additionally has such transverse rigidity that the lateral stabilization of the pneumatic tire will be assured. The pneumatic tire consequently, in view of this buildup, has the properties of a belted tire.

FIGS. 2, 2a and 2b show location of the foregoing components and additionally the latter two views illustrate ends 11a, 11b and 11' of thread sections 10.

Of particular importance in connection with the evaluation of the invention are the thread sections 10.

For purposes of building up the unfinished tire, nonvulcanized rubberized cord fabric layers 6' are employed in a manner known per se. The cord threads 7' of said cord fabric layer 6 are first stretched out so as to be straight. For purposes of forming the angled off portion within the area of the tire shoulders 9, the cord threads 7' are angled off in the tire-building drum in such a way that the thread sections 8' and the thread sections 10' and also the thread sections adjacent thereto for the tire sidewalls 3, will be formed. When the thread cords 7' are in a flat, straightened out approximately cylindrical state, the cord threads 7' show a course as illustrated in Fig. 3. Inasmuch as the cord threads 7' are interconnected by means of the unvulcanized plastic elastic rubber therebetween, it will be appreciated that in view of the angled off portion, which with a finished tire extends into the area of the tire shoulder 9, a deformation is obtained not only of the cord threads 7' but also of the rubber material between said cord threads 7' This rubber, however, thereupon has the tendency to restore the original stretched position of the cord threads 7'. The forces acting in this connection are indicated in the drawing by the letters A and B.

After the bead cores 5 have been applied to the tire layers on the tire bead drum, the threaded sections 10 to which the ends 11 belong, are looped around the bead cores 5. Thus, a course of the threads as illustrated in FIG. 4 is obtained which for all practical purposes corresponds to that of FIG. 2. In view of the folding over and looping of the thread sections 10 about the bead cores 5, a stress equalization is obtained. The forces A and B effective in conformity with FIG. 3, are according to FIG. 4, opposed to each other, and since the thread sections 11 or the rubberization thereof are in immediate contact with the rubberization of the cord threads which in the sidewalls 3 with the finished tire are adjacent to the inner chamber formed by the tire, the forces A and B can in view of the said frictional contact, not become effective. They rather cancel each other and prevent the occurrence of undesired deformations in the longitudinal sections of the cord threads 7 during and after the forming of the tire. With the finished tire, the cord threads 7 will extend through the tire sidewalls 3.

The inclined ends 11 additionally bring about an increase in the adhesion between the superimposed rubberized cord threads and result in a better anchoring of the core threads. A further result brought about by the inclined ends 11 consists in that with the finished tire, the strength within the area of the tire shoulders 9 is increased. The ends 11 may extend still beyond the central line 13 of the tire and may have a straight continuation. The ends 11 also bring about a strengthening within that area of the tire body in which the cord threads inwardly thereof are bent or angled off.

It is, of course, to be understood, that the present invention is, by no means, limited to the particular structure shown in the drawing, and that the scope of the invention is defined by the appended claims.

We claim:

1. A pneumatic vehicle tire with a carcass reinforcement of substantially parallel strength members which pass in one piece from bead to bead while forming components of rubberized cord layer means and in the tire sidewalls extend at least approximately at right angles with regard to the circumferential direction of the tire whereas in the zenith portion of said tire said strength members pass across the width of the tread strip at an angle of from 5° to 30° with regard to the tire circumferential direction, those portions of said strength members which extend from bead to bead being looped around the beads and being extended back into the shoulder areas of the tire, those strength member portions which after being looped around the beads pass through the tire sidewalls into the tire zenith portion, and belt layers extending substantially over the width of the tread strip only with the ends of said belt layers located between the strength member portions extended back into the shoulder areas of the tire on one hand and the strength member portions extending from bead to bead on the other hand.